United States Patent [19]

Tidman

[11] Patent Number: 4,917,335
[45] Date of Patent: Apr. 17, 1990

[54] APPARATUS AND METHOD FOR FACILITATING SUPERSONIC MOTION OF BODIES THROUGH THE ATMOSPHERE

[75] Inventor: Derek A. Tidman, Falls Church, Va.

[73] Assignee: GT-Devices, Alexandria, Va.

[21] Appl. No.: 177,916

[22] Filed: Mar. 31, 1988

[51] Int. Cl.[4] .......................... B64C 30/00; B64C 1/38
[52] U.S. Cl. ..................................... 244/130; 102/490
[58] Field of Search .................. 244/130, 1 N, 117 A, 244/158 A, 160; 102/490

[56] References Cited

U.S. PATENT DOCUMENTS

| | | | |
|---|---|---|---|
| 2,854,925 | 10/1958 | Crockford et al. | 102/92 |
| 2,928,319 | 3/1960 | Sokolowski | 244/122 |
| 3,170,406 | 2/1965 | Robertson | 417/380 |
| 3,234,727 | 2/1966 | Filer | 60/632 |
| 3,259,065 | 7/1966 | Ross et al. | 102/50 |
| 3,267,857 | 8/1966 | Lindberg, Jr. | 244/158 A |
| 3,292,363 | 12/1966 | Wahl | 60/632 |
| 3,524,367 | 8/1970 | Franz | 83/53 |
| 3,610,217 | 10/1971 | Braun | 417/380 |
| 3,620,484 | 11/1971 | Schoppe | 244/1 N |
| 3,643,901 | 2/1972 | Patapis | 244/130 |
| 3,861,166 | 1/1975 | Goldsberry | 417/396 |
| 4,029,440 | 6/1977 | Olsen | 91/305 |
| 4,029,442 | 6/1977 | Schlosser | 417/403 |
| 4,326,380 | 4/1982 | Rittmaster et al. | 60/595 |
| 4,650,139 | 3/1987 | Taylor et al. | 244/161 |

OTHER PUBLICATIONS

DeWitt, Jack R., "Models and Sabots for Two-Stage Light-Gas Launcher", presented by John Cable, Calspan Corporation/AEDC Division, Arnold Air Force Station, Tenn. (copy of hand-out material presented at the Electromagnetic Launcher Assoc. Charter Meeting, Nov. 5-7, 1985 at the Center for Electromechanics, The University of Texas at Austin).
Thio, Y. Chia and Tidman, Derek A., "High Velocity Electrothermal (HVET) Ground-to-Space Launcher", published in AIAA/DARPA Meeting on Lightweight Satellite Systems, Naval Postgraduate School, Aug. 4-6, 1987, Monterey, Calif.
Lantz, Edward, "A High Energy Launcher for Trans Atmospheric Vehicles".

*Primary Examiner*—Joseph F. Peters, Jr.
*Assistant Examiner*—Rodney Corl
*Attorney, Agent, or Firm*—Lowe, Price, LeBlanc, Becker & Shur

[57] ABSTRACT

Atmospheric drag and heating of the forwardmost portions of high speed transatmospheric vehicles and projectiles are reduced by lowering the atmospheric mass density immediately forward of a moving body. A fine high speed stream or jet of a material containing a chemically interactive component is ejected forwardly of such a body moving at high speed with respect to the atmosphere and, in a preferred embodiment of this invention ignites by interaction with the oncoming atmosphere and forms a sustained zone of combustion that, in effect, acts as a maintained "fireball" that explodes away ambient atmosphere transversely of the moving body so that there is generated a zone of low atmospheric density immediately in front of the forwardmost portion of the body. A supply of ejectable material and equipment for forcibly driving the same through a nozzle are carried with the body. The ejected material is preferably pressurized to render it flowable before ejection. The addition of fine particulate material and/or material forming long chain molecules to the flammable component of ejected material facilitates projection of the fireball ahead of the moving body and, also, to increase the transverse dimension of the zone of reduced atmospheric mass density generated thereby.

44 Claims, 6 Drawing Sheets

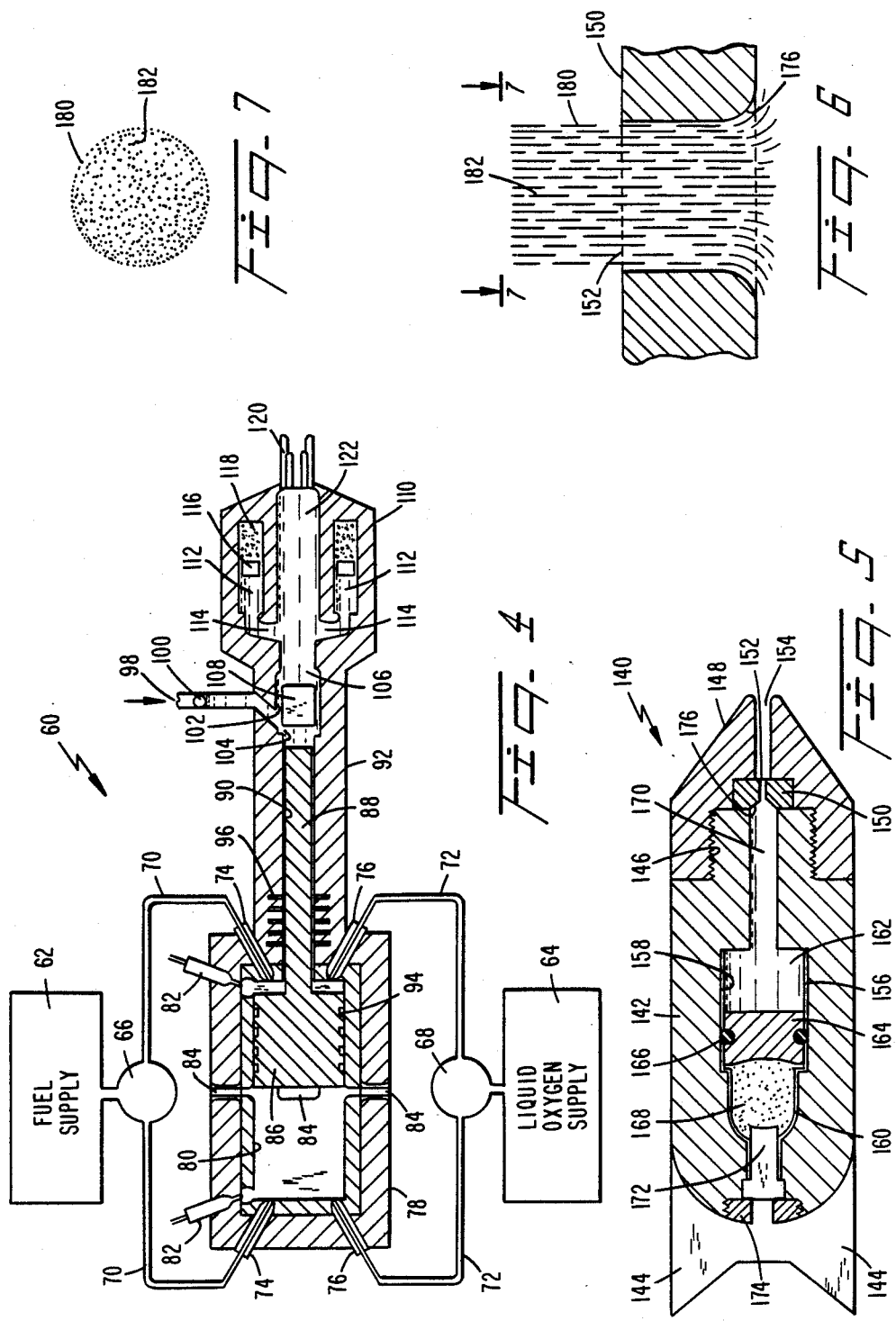

APPARATUS AND METHOD FOR FACILITATING SUPERSONIC MOTION OF BODIES THROUGH THE ATMOSPHERE

FIELD OF THE INVENTION

The present invention relates to facilitating supersonic travel of a body through the atmosphere and, more particularly, to reducing atmospheric mass density immediately in front of the body by ejecting a mass of material forwardly from the body, e.g., a transatmospheric vehicle (TAV) or projectile, so that the ejected material interacts in the atmosphere to provide the reduced atmospheric density.

BACKGROUND OF THE PRIOR ART

When a solid body moves at supersonic speed through the atmosphere a shock wave is created immediately in front of the body. Many supersonic bodies have a pointed nose configuration that helps reduce atmospheric drag. In such a case there is only a very small area in front of the supersonic body having a detached normal shock wave, i.e., one normal to the direction of motion of the vehicle. The developed shock wave is essentially an oblique wave attached for practical purposes to the point of the nose portion. There is only a relatively small pressure rise behind the oblique wave, resulting in a significantly reduced drag on the body. In essence, supersonic bodies having noses with small divergence angles do not have a substantial stagnation zone, as would otherwise occur behind a substantial normal shock wave directly in front of the vehicle.

As the speed of the TAV or projectile becomes considerably higher than Mach 1, problems of aerodynamic drag and heating become commensurately more serious. This is because the strength of the shock waves generated by motion of the body depends on Mach number; the higher the Mach number the higher is the pressure of the atmosphere directly behind the shock waves and essentially adjacent to the nose portion of the body.

Numerous solutions have been proposed for reducing the aerodynamic drag and the heat generation in front of supersonic bodies, with each solution focusing on a particular benefit. Ross et al, U.S. Pat. No. 3,259,065, discloses a high-velocity forwardly directed flow of cooled air projected at supersonic velocity directly in front of a blunt leading portion of the body to form a jet or virtual spike. This virtual spike extends forward into the oncoming supersonic air stream until it terminates at a point forward of the body where a shock wave commences due to interaction between the cooled jet air flow and the oncoming atmosphere. Behind this shock wave, a subsonic boundary layer on the virtual spike forms a conical trapped air region. Consequently, the air flow around the body is substantially identical to that which would have been produced by a conventional elongated nose cone or probe. Among the benefits thus obtained are: (1) the substantial elimination of a high temperature zone directly in front of the vehicle nose, where it is most advantageous to locate infrared or similar sensor devices, and (2) a certain degree of control over the aerodynamic drag by varying the amount and angle of attack of cool air flowing from the vehicle.

Taylor et al, U.S. Pat. No. 4,650,139, discloses a solid aerospike attached, for example, to the nose of an asymmetrical space vehicle, e.g., a vehicle which carries the space shuttle. The aerospike alters the aerodynamic effect on the entire vehicle during supersonic space flight through the atmosphere. The aerospike basically comprises a tapered elongated tubular element having a first end attached to the space vehicle nose and a second or free end terminating in a substantially rounded disklike tip member, as illustrated in FIG. 7 of this reference. The aerospike can be either flexible or rigid and may include means for emitting a fluid, e.g., a gas or a liquid, from the tip member to enhance aerodynamic flow. The presence of the disk-like free end of the aerospike, possibly coupled with the flow of a fluid therefrom, inter alia, serves to retard or eliminate reattachment of shock waves that would otherwise be generated by supersonic motion of the space vehicle. The distance the aerospike is projected forward of the vehicle and the flow rate of the fluid emitted from the forward end thereof are controlled parameters.

Although both Ross et al and Taylor et al disclose controlling the flow rate of a fluid to a region ahead of the forwardmost portions of a supersonic body, neither is concerned with reducing the atmospheric mass density in front of the body by ejecting a mass of material forwardly from the body wherein the ejected material reacts with material in the atmosphere to provide the desirable reduction in atmospheric mass density to reduce drag and heating of the body.

Schoppe, U.S. Pat. No. 3,620,484, on the other hand, discloses reducing the strength of the shock wave and the consequential fluid drag on a supersonic vehicle, by using a small diameter gas tube or pipe protruding from the front of the body so that the forwardmost portion or nose of this gas tube generates relatively small normal shock waves. If a gas is emitted from the tube, the head end of the main body (which is further downstream from the gas-emitting free end of the gas tube) generates an additional strong shock wave in conventional manner. It is believed that this maintains the air flow around the nose of the supersonic vehicle body and may eliminate the sonic boom which normally accompanies the presence of such shock waves. In Schoppe, the supersonic body has a blunt nose and means for applying heat to the zone immediately in front of and surrounding the nose surface so that there is substantial nose shock wave reduction while heat is being applied. There is a controlled flow of fuel laterally of the forwardly extended spike, at a point closer to the end where the spike is attached to the blunt main supersonic vehicle body than to the front of the gas tube. Burning fuel in the high compression zone defined by the relatively weak shock wave attached to the front end of the gas tube, to provide controlled amounts of heat at selected locations in front of the main blunt supersonic vehicle body significantly reduces the strength of the shock waves that otherwise would be generated by the body. This reduces the aerodynamic drag and, by a carefully controlled unsymmetrical application of added heat, selective use of perpendicular forces on the supersonic vehicle can be used to control its flight.

In the above-discussed prior art, a fluid flows from the body, directed either forwardly or laterally of the line of motion of the body. In none of the discussed references is there a flow of material provided from the supersonic body to form immediately in front of the supersonic body a low mass density atmosphere of a large enough transverse cross-section to receive the entire supersonic body.

Various generalized suggestions have been made within the relevant field of art for employing lasers to reduce atmospheric pressure by projecting laser beams; however, no specific or concrete proposals for suitable apparatus or method to accomplish this are presently known.

DISCLOSURE OF THE INVENTION

Accordingly, it is an object of this invention to provide a new and improved apparatus and a method for controllably generating and maintaining a region of reduced atmospheric mass density in front of a body travelling at supersonic speed through the atmosphere.

A related object of this invention is to provide apparatus and a method for simply and controllably generating and maintaining a controlled release of thermal energy in front of a body travelling at supersonic speed through the atmosphere, to thereby create a region of reduced atmospheric density immediately in front of the supersonic body of an extent such that the body experiences reduced aerodynamic drag and frictional heating.

Another related object of the invention is to provide an apparatus for and a method of generating and maintaining combustion of a flammable material immediately in front of a supersonic body travelling through the atmosphere to provide a region of reduced mass density through which the supersonic body travels so that the body experiences lower drag and frictional heating than would otherwise be the case.

A further object of this invention is to provide an apparatus for and method of causing combustion of a flammable flowable material projected forwardly from a body travelling at supersonic speed through the atmosphere, in such a manner that an interaction between the high velocity flammable material stream and the oncoming atmosphere creates a maintained combustion region ahead of the forwardmost portions of the supersonic body, to continually displace the oncoming atmosphere laterally of the line of motion of the supersonic body so that the supersonic body, in effect, continually travels through a low mass density hole bored through the atmosphere and thus experiences relatively low drag and consequential frictional heating.

These and other objects of this invention are achieved by providing apparatus carried on a body, e.g., a transatmospheric vehicle (TAV) or projectile moving at a supersonic speed relative to the atmosphere, wherein the apparatus includes a supply of a material adapted to be carried with the body and adapted to be ejected from the body, the material having a component that interacts in the atmosphere to generate an atmospheric zone of reduced density, and means for ejecting the material as a controlled stream or jet forwardly of the body into the supersonically approaching atmosphere for producing an interaction of the interactive component of the ejected material in the atmosphere at a predetermined distance ahead of the body, thus generating an atmospheric zone of reduced mass density in front of the body.

In another aspect of this invention, supersonic traversal of the atmosphere by a body is facilitated by generating and maintaining a region of reduced atmospheric mass density in front of the body travelling at supersonic speed through the atmosphere by ejecting a mass of a material from the body forwardly thereof so that the ejected mass interacts in the atmosphere to provide a reduced atmospheric density in front of the body.

Still other objects and advantages of the present invention will become readily apparent to those skilled in the art from the following detailed description, wherein only the preferred embodiment of this invention is disclosed in detail simply by way of illustration of the best mode contemplated for carrying out the invention. As will be appreciated, this invention is amenable to other and different embodiments, and its several details are capable of modification in various obvious respects, all without departing from the invention. Accordingly, the drawing and description are to be regarded as illustrative and not restrictive in nature.

BRIEF DESCRIPTION OF THE DRAWINGS

FIG. 4 is a longitudinal cross-sectional view of a preferred embodiment of apparatus according to this invention in a form particularly suitable for use with a relatively large supersonic vehicle.

FIG. 5 is a vertical cross-sectional view of a one-shot projectile employing a second preferred embodiment of this invention particularly suited for relatively small bodies traversing the atmosphere at supersonic speeds.

FIG. 6 is a cross-sectional view along the axis of the nozzle ejecting a stream or flow of material, illustrating the general streamline paths in the flow.

FIG. 7 is a cross-sectional view of the material flow in the stream illustrated in FIG. 6, at section 7—7 thereof.

DESCRIPTION OF THE PREFERRED EMBODIMENTS

The drag force F and total aerodynamic heat input rate Q experienced by a high Mach number (M>1) body traversing the atmosphere and having a crosssectional area $A_{TAV}$ can be expressed as $$F = -\tfrac{1}{2} C_D \rho_o V_o^2 A_{TAV}$$

$$Q = \tfrac{1}{2} \lambda \rho_o V_o^3 A_{TAV}$$

where $C_D$ is the drag coefficient and $\lambda$ the heat transfer coefficient. "TAV" is used in this analysis to indicate parameters relating to a transatmospheric vehicle, but the relationships developed here are applicable to any "body" traversing the atmosphere, e.g., a projectile. Although these coefficients are functions of Mach number, TAV geometry, Reynolds number, and ablating surface materials, both F and Q can in general be reduced by reducing the air density just ahead of the TAV bow shock below the ambient air density $\rho_o$. For a TAV velocity which has a corresponding Mach number that is greater than 1 relative to air in the hot rarefaction channel, both the air pressure and enthalpy are reduced in the shocked flow adjacent to the forwardmost TAV surface if the atmospheric mass density is controllably and continuously reduced. Providing this desirable condition is one goal of this invention and is realized by simple apparatus, as described hereinafter with reference to specific embodiments particularly suitable for TAVs and projectiles.

Figure 1:
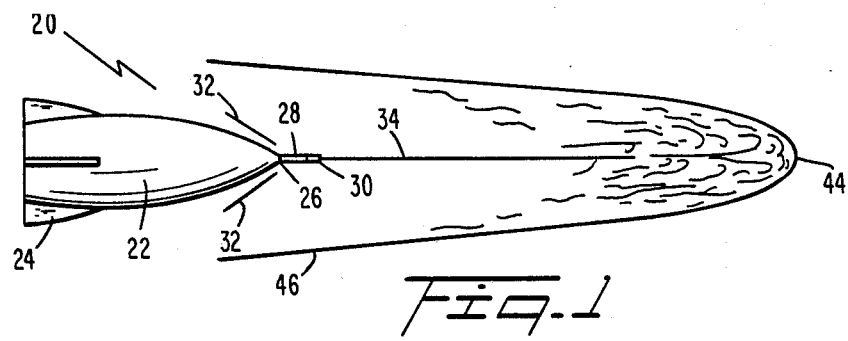
FIG. 1 is a schematic side view of an exemplary supersonic trans-atmospheric vehicle (TAV) from which is projected a forwardly directed fine stream or jet of a material that includes a flammable component which interacts with the oncoming atmosphere to create and maintain a combustion zone or "fireball" at a predetermined point forwardly of the vehicle.

FIG. 1 is a schematic side view of a TAV 20 having a generally aerodynamic form 22 tapering toward the front and one or more fins 24 to provide flight stability and maneuverability. The forwardmost portion of the main body 22 is the pointed nose 26 to which, according to the present invention, is preferably attached an elongate cylindrical barrel 28 aligned with the principal axis of the TAV 20. As will be appreciated by persons skilled in the art, given no more than this structure, there would be a normal shock wave and attached oblique shock waves in front of section 30 of barrel 28, and a plurality of shock waves 32 obliquely attached to the main body of the TAV. Even when apparatus is employed as taught in this invention, it is expected that there will be shock waves 32 obliquely attached to portion 26 of TAV 20.

By means of apparatus and methods to be described more fully hereinafter, in a preferred embodiment of this invention a high speed fine stream or jet 34 of a selected flowable material containing a flammable component is forcibly ejected from open end 30 of barrel 28, preferably along the line of motion of TAV 20. Under most circumstances, particularly when TAV 20 is traversing the atmosphere at supersonic speed, stream 34 will be ejected in alignment with the axis of barrel 28.

The term "ejected flammable material", in its broadest sense in the present context, should be understood as including at least one flammable component and possibly one or more of a particulate component, long-chain molecules, an oxidizing component, and even a second flammable component oxidizable under different conditions, the ejected material being flowable or made flowable for ejection as a high speed stream. Convenient flammable components of the ejected material include typical jet aviation fuels such as JP3 or JP4, commercially available in either liquid or gel form. Even a material such as paraffin (a typical solid hydrocarbon) can be ejected under pressure like a liquid even without first being melted although a small amount of heat to melt it may be helpful.

Particulate materials suitable for use with the present invention include powdered carbon, powdered hydrocarbons, polyethylene powder and the like, as well as fine powders of metallic materials such as boron, magnesium and aluminum. All such finely divided materials will readily burn in atmosphere in the "fireball" generated ahead of the supersonic body. It should be noted, incidentally, that the specific chemical energy released by combustion of these materials is not too different from the 43 kJ/gm value obtainable by combustion of a liquid fuel material such as JP4. Hence inclusion of such particulates should not significantly alter any of the theoretical solutions discussed hereinafter. Also includable with such flammable materials are known oxidizer-type chemicals, in liquid, gel or solid forms, of the type familiar in the chemical rocket propulsion art. The use of such oxidants should promote the release of chemical energy in the ejected material.

The material ejected as stream 34 is itself travelling with the TAV, i.e., at a velocity $V_o$ with respect to a static atmosphere, as well as a stream or jet velocity $V_J$ with respect to the TAV itself. Therefore, at the open end 30 of barrel 28, when stream 34 leaves the TAV, i.e., before it has interacted with the oncoming atmosphere and slowed down in any manner, the material of stream 34 is moving at a total velocity of $(V_J+V_o)$ with respect to an inertial frame fixed in the atmosphere. At this point, therefore, the material of stream 34 has a specific kinetic energy $(V_J+V_o)^2/2$. To the extent that the components of the material of stream 34 have a specific chemical energy $\epsilon_{chem}$ upon chemical reaction with atmospheric oxygen, per unit mass ejected as stream 34 from the TAV, there is potentially available a total specific energy equal to the sum of the specific chemical energy and the specific kinetic energy.

It is intended that the total kinetic energy contained in stream 34 be controllably and substantially utilized to generate a combustion region or "fireball" a predetermined distance ahead of open end 30 of barrel 28, and that the corresponding very high release of energy be employed to displace the atmosphere not yet traversed by the TAV immediately outward in all directions from the virtual center of the fireball. Naturally, persons skilled in the art will appreciate that the term "fireball" as utilized for present purposes does not signify a perfect sphere, but is a descriptive term intended to label a relatively compact zone in which the total energy of material ejected in stream 34 is released rapidly, e.g., by combustion with available oxygen in the oncoming atmosphere.

For proceeding further, it is useful to appreciate that the amount of energy required to be produced on the TAV to generate stream 34 with a mechanism of overall efficiency "e" is $(V_j^2/2e)$ per unit mass. This is, clearly, very much smaller than the total specific energy that is releasable from the material of stream 34 in and at the fireball. It will also be appreciated that, in principle, air in the oncoming atmosphere ahead of open end 30 of barrel 28 can be exploded aside by a fuel mass much smaller than the air mass displaced, since one atmosphere of ambient air has an energy density of approximately 200 J/gm whereas $\epsilon_{chem}$ is approximately equal to 43 kJ/gm if the material used is a conventional turbine engine fuel, e.g., JP3 or JP4. Under practically realizable conditions, the optimum mass air-to-fuel ratio for combustion of such a material is approximately 15:1.

Taking into account the considerations described hereinabove, it will be appreciated that with the expenditure of only a relatively small amount of power from means carried with the vehicle, ejection of the high speed stream 34 to cause its flammable components to undergo combustion in the oncoming atmosphere will result in a highly effective thrusting aside of the ambient atmosphere. Theoretical considerations, to be described concisely hereinafter, indicate that an effective reduction in the mass density experienced by forwardmost portions of the TAV travelling in the wake of the fireball will be between one-half and one-eighth of the static mass density of the atmosphere for high Mach numbers, e.g., $M>2$, the benefits thus derived being dependent on prevailing conditions, e.g., the vehicle speed in absolute terms, the altitude above sea level, and the like.

Figure 2:
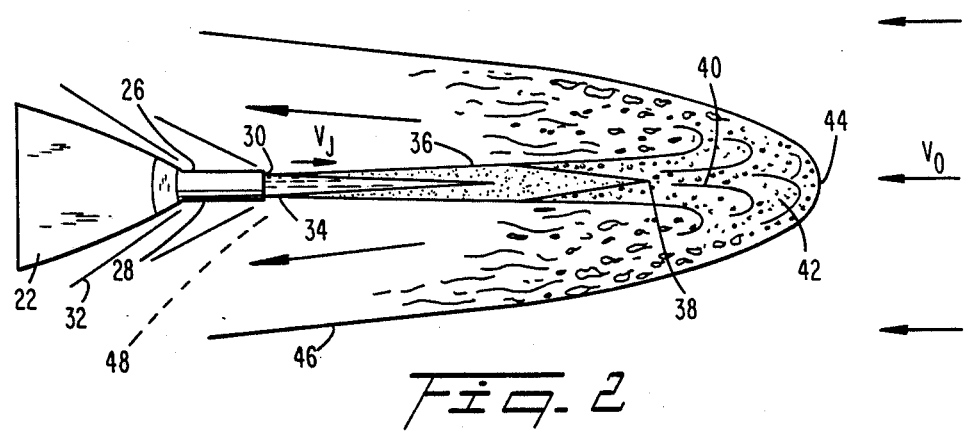
FIG. 2 is a schematic vertical cross-sectional view of the fluid flow region in front of the forwardmost portion of the supersonic vehicle schematically illustrated in FIG. 1.

Referring now to FIG. 2, a description follows of the mechanism believed to be accountable for the generation and maintenance of the so-called "fireball" controllably and continuously in a useful manner according to this invention. Thus, as the high speed stream or jet 34 is ejected from the open end section 30 of barrel 28, there is an immediate interaction at its outer cylindrical surface with adjacent atmosphere moving at a very high speed relative thereto. Considering the very high velocities involved, it is believed that this interaction between the stream 34 and the atmosphere therearound causes turbulence in the ejected material flow and that this turbulence becomes progressively more pronounced, e.g., at location 36 forward of open end 30 of barrel 28.

As will be appreciated, turbulence involves momentum components in all directions, so that stream 34 loses coherence in a transverse direction and from a point 38 begins to physically break up into discrete smaller portions of the ejected material. These discrete portions will have developed a noticeable transverse momentum and by point 40 will have become practically a fine spray or mist 42. Interaction of this fine mist-like material ejected from the TAV with the oncoming atmosphere moving at supersonic speed with respect to the TAV generates a region of very high shock wave-type interaction with the atmosphere, the result being an effectively detached shock wave 44 across which very high temperatures will be generated and will ignite the fine spray 40 converted, effectively, into a sustained "fireball" 42.

In practice, therefore, fireball 42 will be maintained at a distance ahead of open end 30 of barrel 28, this distance being determined by $V_j$ and $V_o$ as well as the mass density of the ejected material and the mass density of the ambient atmosphere (this being higher at close to sea level than at a considerable height above sea level). The combustion of flammable components from the ejected material in fireball 42 will, as described hereinbefore, cause a virtual explosion in all directions and this will have the desired and intended effect of displacing ambient atmosphere radially outward of the line of approach of the TAV. As the exploding and burning mixture of ejected material and air moves transversely of the line of motion of the TAV, there is generated an ever-widening zone contained within an enlarging well-defined envelope 46 sufficiently large to accommodate substantially the entire TAV. The mass density of the atmosphere by point 48, just ahead of nose 26 of the TAV thus will be considerably lower than it would have been without the ejection of stream 34 as described above. See FIG. 2.

Figure 3:
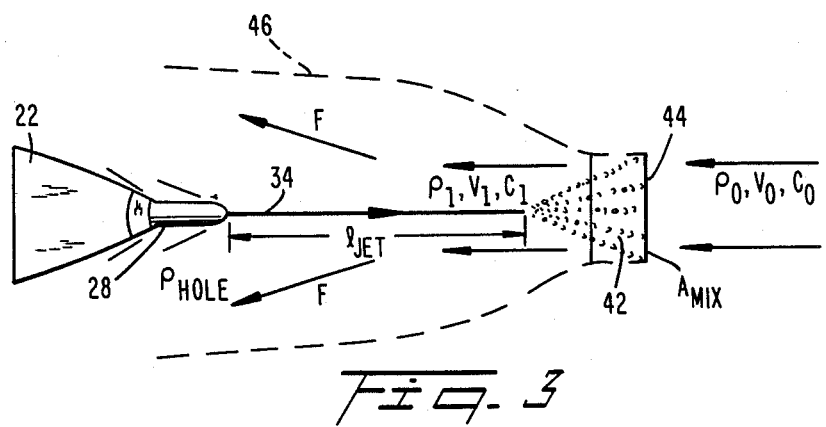
FIG. 3 is a simplified model, substantially in vertical cross-section, of an idealized flow of atmospheric air in a region immediately forward of the forwardmost portion of an exemplary vehicle employing apparatus according to this invention to maintain combustion of a combustible material forwardly of the vehicle.

Analysis of the flow conditions described hitherto is facilitated by an approximation schematically illustrated in FIG. 3. For purposes of FIG. 3, the reference frame is fixed with respect to the TAV 22 and in this fixed reference frame, at a transverse plane 44 (corresponding to the shock wave 44 per FIG. 2) there is provided a flow of ambient atmospheric air at a velocity $V_o$ and a density $\rho_o$, in which the sound speed is $c_o$, substantially as illustrated in FIG. 3. As this atmospheric flow crosses plane 44 in this somewhat simplified model, flammable material is provided in a fireball zone 42 downstream of plane 44 in the frame of reference fixed in TAV 22. The transverse expanse of this zone, closely corresponds with that expected under real life conditions that must be obtained per FIG. 2. Radial spreading of the flammable particle spray is assisted by the combustion process itself which tends to transversely blow apart this region of the flow. In this combustion region, it is important for the flammable spray to spread out sufficiently far radially so that the mass flux of shocked air intersected and mixed with is at least 15 times the mass flow of ejected material injected continuously therein so that complete combustion of any flammable component can occur.

Obviously, assisted by analysis of models as illustrated in FIGS. 2 and 3 a certain amount of experimental investigation will be necessary for each flammable material selected with account taken of the velocity of the stream 34, the velocity of the TAV 22, and the height above sea level. The basic principle, however, is exactly the same, namely that at least one flammable component of the ejected material, because it is moving at an extremely high velocity relative to the ambient atmosphere, becomes sufficiently heated thereby to ignite and burn the oxygen provided by the atmosphere and that the flow of flammable material provided by the stream or jet 34 maintains a continuous exploding "fireball" 42.

Referring back to FIG. 3 again, when making various simplifying assumptions of the type common in aerodynamics, flow from the fireball region 42, as it moves toward TAV 22, will expand laterally as indicated generally by arrows F. A simplified analysis of the region behind point 40 is modeled as an axial one-dimensional combustion flow transition from an area $A_{mix}$ perpendicular to the incoming air flow. Parameters behind this transition zone are then calculated using the conventional conservation relations in which the injected fuel is treated as a uniform source of mass, momentum and energy entering the air flow and distributed uniformly across the area $A_{mix}$. Immediately behind this region, therefore, the combustion products and air have a pressure and temperature much higher than those of the ambient air, but a density that may be only a few times higher than the incoming ambient air density. This region then expands radially and axially as it is convected toward the TAV, and this results in a drop in gas density below the ambient air density $\rho_o$ as the gas flows past the TAV. This expansion process may conveniently be treated as a problem comparable to that of flow in an adiabatic nozzle expansion.

Notation

The following notation is used in the model, for which it is assumed that a conventional liquid fuel alone, e.g., only JP4, is utilized as the ejected material.

$\rho_o$, $P_o$, $c_o$, $\gamma$ = ambient air mass density, pressure, sound speed, and specific heat ratio $c_p/c_v$;

$V_o$, $M$ = TAV velocity through the ambient air, and Mach number $V_o/c_o$;

$\rho_1$, $P_1$, $c_1$, $-V_1$, $\gamma$, $M_1$ = gas density, pressure, sound speed, velocity, $c_p/c_v$, and $V_1/c_1$, of gas behind the detonation wave in the TAV rest frame;

$\rho_{hole}$, $T_{hole}$, $-V_{hole}$, $A_{hole}$, $P_{hole}$, $\gamma$, $M_{hole}$ = gas density, temperature, velocity, flow channel area, pressure, $c_p/c_v$, and $V_{hole}/c_{hole}$, just ahead of the TAV bow shock;

$\rho_J$, $V_J$, $A_J = \pi d_J^2/4$, $\beta$, $\alpha$, $\epsilon_{chem}$ = liquid fuel jet density, velocity in the TAV rest frame, cross sectional area at injection, jet Mach number $\beta = V_J/c_o$, fuel/air mixing ratio, and chemical energy per unit mass of fuel liquid upon combustion with air;

$C_D$, $A_{TAV} = \pi d_{TAV}^2/4$ = TAV drag coefficient and maximum cross-sectional area;

$A_{mix}$ = detonation wave area;

$l_{Jet}$ = penetration length of fuel jet into the air stream ahead of the TAV;

$l_{barrel}$ = length of the jet launch extension tube.

It is assumed that $\gamma$ is a constant throughout the flow behind the combustion transition and past the TAV. The value assumed for $\gamma$ will be at a mean high temperature in this flow region. The same value of $\gamma$ will also be used for the cool ambient air, but this causes little error since the internal energy of the ambient air is very small compared with its kinetic energy relative to the TAV.

The conservation of mass, momentum, and energy flow through the combustion shock transition are:

$$\rho_1 V_1 = \rho_o V_o + \frac{\rho_J A_J V_J}{A_{mix}}, \quad (1)$$

$$\rho_1 V_1^2 + P_1 = \rho_o V_o^2 + P_o - \frac{\rho_J V_J^2 A_J}{A_{mix}}, \quad (2)$$

$$\rho_1 V_1 \left[ \tfrac{1}{2} V_1^2 + \frac{c_1^2}{(\gamma - 1)} \right] = \quad (3)$$

$$\rho_o V_o \left[ \tfrac{1}{2} V_o^2 + \frac{c_o^2}{(\gamma - 1)} \right] + \frac{A_J \rho_J V_J}{A_{mix}} (\tfrac{1}{2} V_J^2 + \epsilon_{chem}).$$

These equations allow for the injection of mass, momentum, and energy, by the fuel jet which is assumed to spread evenly over an area $A_{mix}$ as shown in FIG. 3. The pressures are given by:

$$P_{o,1} = \frac{\rho_{o,1} c_{o,1}^2}{\gamma}, \quad (4)$$

where $c_{o,1}$ are the sound speeds.

The following definitions are useful:

$$\begin{cases} \alpha = \dfrac{A_J \rho_J V_J}{A_{mix} \rho_o V_o} = \text{fuel/air mixing ratio}, \\[4pt] M = \dfrac{V_o}{c_o} = \text{Mach number of } TAV \text{ in ambient air}, \\[4pt] \beta = \dfrac{V_J}{c_o} = \text{Mach number of jet} \end{cases} \quad (5)$$

The solution to equations (1) to (3) can then be written as:

$$(\gamma + 1)\left(\frac{V_1}{V_o}\right) = \gamma A + \{\gamma^2 A^2 - B(\gamma^2 - 1)\}^{\tfrac{1}{2}} \quad (6)$$

$$\frac{\rho_o}{\rho_1} = (1 + \alpha)^{-1}\left(\frac{V_1}{V_o}\right) \quad (7)$$

$$\frac{c_1^2}{c_o^2} = \frac{T_1}{T_o} = \frac{M^2}{2}(\gamma - 1)\left\{B - \left(\frac{V_1}{V_o}\right)^2\right\} \quad (8)$$

$$\frac{P_1}{P_o} = \frac{\rho_1 T_1}{\rho_o T_o} \quad (9)$$

where $$\begin{cases} A = (1 + \alpha)^{-1}\left\{1 + \dfrac{1}{\gamma M^2} - \dfrac{\alpha\beta}{M}\right\} \\[6pt] B = (1 + \alpha)^{-1}\left\{1 + \dfrac{1}{M^2}\left[\dfrac{2}{(\gamma - 1)} + \alpha\beta^2 + \dfrac{2\alpha\epsilon_{chem}}{c_o^2}\right]\right\} \end{cases} \quad (10)$$

The positive root solution in (6) is chosen because this corresponds to the transition that is sustained by the jet sources in equations (1) to (3), i.e., as $\rho_J \to 0$, $V_1/V_o \to 1$.

Following the combustion transition, the hot gases are assumed to expand adiabatically as they flow and accelerate towards the TAV in FIG. 3. For present purposes, consideration is restricted to a situation in which the expansion continues until an approximate radial pressure equilibrium with the background air pressure $P_o$ is reached, at which point the channel area has expanded from $A_{mix}$, $P_1$, $c_1$, $V_1$, and the radially averaged flow parameters at the TAV are $A_{hole} = A_{TAV}$, and $P_{hole} = P_o$, $c_{hole}$, $V_{hole}$. Thus, $$\frac{A_{hole}}{A_{mix}} = \frac{M_1}{M_{hole}}\left\{\frac{1 + \tfrac{1}{2}(\gamma - 1)M_{hole}^2}{1 + \tfrac{1}{2}(\gamma - 1)M_1^2}\right\}^{\tfrac{\gamma+1}{2(\gamma-1)}}, \quad (11)$$

$$\frac{T_1}{T_{hole}} = \frac{c_1^2}{c_{hole}^2} = \left\{\frac{1 + \tfrac{1}{2}(\gamma - 1)M_{hole}^2}{1 + \tfrac{1}{2}(\gamma - 1)M_1^2}\right\}, \quad (12)$$

$$\frac{\rho_1}{\rho_{hole}} = \left(\frac{T_1}{T_{hole}}\right)^{1/(\gamma-1)}, \quad (13)$$

$$\frac{P_1}{P_{hole}} = \left(\frac{T_1}{T_{hole}}\right)^{\gamma/(\gamma-1)} \quad (14)$$

$$\frac{V_{hole}}{V_1} = \frac{M_{hole} c_{hole}}{M_1 c_1}, \quad (15)$$

where $M_1$ and $M_{hole}$ are the local flow Mach numbers.

The fuel/air mixture ratio $\alpha$ appears in equations (6) to (10). For complete combustion to occur in the combustion transition $A_{mix}$ must be sufficiently large for the air flow to provide the needed oxygen, e.g., for JP4 aviation fuel which is a suitable flammable material for ejection in the stream or jet, $$\alpha \leq \alpha_{max} \approx 0.067 \quad (16)$$

is required. If it is assumed that the Chapman-Jouguet rule for detonation applies, i.e., $$M_1 = \frac{V_1}{c_1} = 1, \quad (17)$$

and also that $\alpha \leqq \alpha_{max}$, physical solutions to (6) are found only for a restricted Mach number range:

$$M = \frac{V_o}{c_o} \leqq M_{det}. \quad (18)$$

In this Mach number range, the leading edge wave is a conventional detonation wave and the Chapman-Jouguet rule (17) is used to calculate $\alpha$ from (6) and thus also $A_{mix}$. The argument is that the detonation will blow the particles or droplets of ejected material out over an area $A_{mix}$ until the combustion pressures become containable by the incoming air flow pressure, which corresponds to the equilibrium value for $A_{mix}$ and $\alpha$ for which the TAV velocity equals the detonation wave velocity. At low TAV Mach numbers quite small values of $\alpha$, i.e., large values for $A_{mix}$, are found.

Applying the Chapman-Jouguet rule, equations (6) to (10) give the detonation wave solution:

$$\frac{V_1}{V_o} = (1+\alpha)\frac{\rho_o}{\rho_1} = \frac{\gamma A}{(\gamma+1)} \quad (19)$$

$$\frac{T_1}{T_o} = \frac{\gamma^2 A^2 M^2}{(\gamma+1)^2} \quad (20)$$

$$\frac{P_1}{P_o} = \frac{\gamma A M^2(1+\alpha)}{(\gamma+1)} \quad (21)$$

with the fuel air mixture ratio determined by $$\alpha = \frac{1}{2E}\{-F + [F^2 + 4EG]^{\frac{1}{2}}\} = \frac{\rho_J V_J A_J}{\rho_o V_o A_{mix}}, \quad (22)$$

$$\left\{ \begin{aligned} E &= \frac{1}{M^2}\left( -\beta^2 + \frac{2\epsilon_{chem}}{c_o^2}(\gamma^2-1) \right) \\ F &= \frac{2\beta\gamma^2}{M}\left(1 + \frac{1}{\gamma M^2}\right) + (\gamma^2-1)\left\{ \frac{1}{M^2}\left(\beta^2 + \frac{2\epsilon_{chem}}{c_o^2}\right) + \frac{2}{M^2(\gamma-1)} + 1 \right\} \\ G &= \left(1 - \frac{1}{M^2}\right)^2 \end{aligned} \right. \quad (23)$$

These equations (16) to (23) apply for $M < M_{det}$ where $$M_{det}^2 = \frac{(\gamma^2-1)(1+\alpha_{max})\{2/(\gamma-1) + \alpha_{max}\beta^2 + 2\alpha_{max}\epsilon_{chem}/c_o^2\}}{\gamma^2[1 + 1/\gamma M_{det}^2 - \alpha_{max}\beta/M_{det}]^2 - (\gamma^2-1)(1+\alpha)} \quad (24)$$

gives $M_{det}$ in a form suitable for iterative solution.

The adiabatic expansion relations (11) to (15) correspond to a supersonic nozzle expansion in which $M_1 = 1$ at the throat for the detonation wave case, i.e., $$\frac{A_{hole}}{A_{mix}} = \frac{A_{TAV}}{A_{mix}} = \frac{1}{M_{hole}}\left\{ \frac{2 + (\gamma-1)M_{hole}^2}{(\gamma+1)} \right\}^{\frac{(\gamma-1)}{2(\gamma-1)}}. \quad (25)$$

The calculational procedure is as follows: For given values of M, $\beta$, $\gamma$, $\epsilon_{chem}$, $c_o$ use (19) to (23) to calculate $\alpha$, $P_1$, $T_1$, $V_1$. Next calculate $T_1/T_{hole}$ from (14) setting $P_{hole} = P_o$, and thus from (12) calculate $M_{hole}$. The ratio $A_{TAV}/A_{mix}$ then follows from (25) and $A_{mix}$ follows for a given $A_{TAV}$. Combining $A_{mix}$ with the previously calculated $\alpha$ from (22) and (23) one obtains the required jet area $A_J$ for a given $\rho_J$, $V_J$.

As was noted earlier, these equations and the conclusions to be drawn from them are believed to be equally useful for ejected materials including components like particulates or long-chain molecule components.

The conventional Chapman-Jouguet detonation rule $M_1 = 1$ has no solutions in the range $M > M_{det}$ (Eq. 24) for $\alpha \leqq \alpha_{max}$. This is because the energy density released by the most energetic fuel mixture is insufficient to heat the air flow in the combustion transition up to a temperature for which $c_1 = V_1$. Although the particles of ejected material may linger in the flow before convection towards the TAV, the combustion gases are convected towards the TAV with $V_1 > c_1$ in this case.

For this high Mach number regime it will be assumed that the fuel particle orbits are able to penetrate across the high speed flow field sufficiently far to achieve a spread area $A_{mix}$ for which $\alpha = \alpha_{max} \approx 0.067$. Since detonation does not occur, it is assumed that the particles are not blown out more widely by combustion gas pressures. The picture is one of burning gases emanating from the continuously replenished particles of ejected material which penetrate across the flow and provide a source of flammable material fixed in space. This transition has some aspects of a detonation wave in that the air is shock heated and compressed in the transition which in turn speeds the burn rate.

The calculational procedure is the same as described hereinbefore except that equations (6) to (10) are used to calculate $P_1$, $c_1$, $T_1$, $V_1$ instead of (19) to (23), and $\alpha$ is given the fixed value $\alpha_{max} \approx 0.067$.

The result of "hole boring" according to this invention is that the TAV drag is reduced by the air density reduction and slightly increased due to forward firing of the jet. An interesting ratio that includes both these terms is:

$$R = \frac{\text{(Retarding force with hole boring system activated)}}{\text{(Retarding force without system activated)}} \quad (26)$$

$$= \frac{C_D(M_{hole})\rho_{hole}V_{hole}^2}{C_D(M)\rho_o V_o^2} + \frac{2\alpha\beta}{C_D M}\left(\frac{A_{mix}}{A_{TAV}}\right),$$

and, in the first term, note that $C_D$ is evaluated at different Mach numbers. A similar ratio exists for the heat flux reduction factor to the TAV skin, but this requires additional analysis. The utility of the system depends on additional considerations of system cost and weight penalty, but a significant reduction of drag and thermal loading, by say factors in excess of 2 or 3, become potentially realizable.

Note that the system weight is expected to be relatively small in that a small mass of flammable material is required to accomplish hole boring. The mass of flammable material required per unit path length can be written as:

$$\frac{dM_{fuel}}{dx} = \frac{A_J \rho_J V_J}{V_o} = \alpha\rho_o A_{TAV}\left(\frac{A_{mix}}{A_{TAV}}\right) << \rho_o A_{TAV} \quad (27)$$

where $\rho_o A_{TAV}$ is the air mass swept out by the TAV per unit path length. These small masses of flammable material required can be readily accommodated by systems inside aerospace TAVs or projectiles as illustrated in FIGS. 4 and 5.

In order for the hole-boring process to be effective, it is necessary for the fuel stream or jet to penetrate the air flow sufficiently far ahead of the TAV to allow combustion and consequential radial gas expansion to occur before traversal of the resulting low density region by the TAV.

The mechanism by which a substantially liquid stream of fluid or jet slows down in air derives from entrainment of air mass into the liquid by the turbulent liquid boundary layer. This causes the jet radius to increase until it breaks up into droplets and filaments that then slow by air drag. Turbulence in the jet derives in part from liquid friction with the launch nozzle walls and from the air-liquid interface.

The inclusion of fine particulate material of a relatively high mass density, e.g., by forming a slurry of a flammable component and particulate matter for ejection as stream or jet 34, may be helpful in maintaining the fireball 42 a greater distance ahead of nose 26 of TAV 22 and, as the fireball releases energy, may provide a greater transverse momentum to the products of combustion. This would widen the cross-section of the hole-bored region to better accommodate a wide TAV.

Also, the addition of long chain polymers to the working liquid has been found to improve the cohesiveness of high velocity jets in other applications, and may also assist in the suppression of near-field spray which should be minimized so that it does not rain back on the TAV. Persons skilled in the art of fluid mechanics will appreciate that if the masses of particulate material and/or long-chain polymer components are substantial then corresponding adjustments may be needed in computation of density ratios and the like, as is customary in such analyses.

When a hole-boring jet is fired with velocity $V_J$ from a TAV moving with velocity $V_o$ through the air, each segment of the jet is launched with velocity $V_o + V_J$ relative to the air. If it is assumed that each segment of ejected substantially fluid material undergoes a constant deceleration "g" in a reference frame at rest in the atmosphere, it reaches its maximum distance from the TAV at a time $\tau = V_J/g$ after being fired from the TAV. In this time the fluid material element advances a distance $(V_J + V_o)\tau - g\tau^2/2$ and the TAV advances $V_o\tau$. Thus, the range that the jet can penetrate ahead of the TAV according to the flow model illustrated in FIG. 3 is $l_{Jet} = V^2_J/2g$. This can be expressed in terms of the total range $l = V^2/2g$ that an equivalent jet would have in reduced density static air, namely:

$$\begin{cases} l_{Jet} \approx \left(\frac{V_J}{V}\right)^2 l \\ l = l(V, \rho_{hole}, d_J, \text{static air}) \\ V = V_o + V_J \end{cases} \quad (28)$$

The reduction factor $(V_J/V)^2$ relating $l_{Jet}$ to $l$ in (28) is probably too small because jets are expected to decelerate more rapidly after becoming inflated with entrained air farther from the nozzle, i.e., the decleration "g" is not constant. However, the relationship does show the importance of using higher jet firing speeds $V_J$ for high TAV velocities. Note also that the equivalent jet ranges $l$ of interest in Eq. (28) for static air jets are for extremely high velocities of several km/sec., i.e., they are supersonic with respect to both the air and flowable material sound speeds. In addition, the oxygen-depleted air-density $\rho_{hole}$ in which the jet propagates is reduced below the ambient air density by the hole-boring "fireball" and by localized air shock heating along the jet boundaries.

Consider next the range required for gas expansion purposes. If it is assumed that the hot combustion products expand rapidly at the sound speed $c_1$ while being convected towards the TAV at $V_1$ (FIG. 3), it is necessary that:

$$(l_{Jet} + l_{barrel}) > \frac{d_{TAV}V_1}{2c_1} \quad (29)$$

where Jet is the jet penetration length and $l_{barrel}$ the length of barrel 28. This condition appears to be readily satisfied, particularly for the Mach number range $M < M_{det}$ over which the combustion transition is a Chap3an-Jouguet detonation wave with $V_1/c_1 = 1$. For such a detonation wave the combustion time is also sufficiently short that the wave stays at rest in a reference frame moving with the TAV.

The equations developed according to the mathematical model described above have been solved numerically and the results have been computed for the following set of input parameters corresponding to hole boring by a TAV in near sea level air:

$$\begin{cases} \rho_o = 10^{-3} \text{ gm/cm}^3 \\ c_o = 0.33 \text{ km/sec} \\ \epsilon_{chem} = 43 \text{ kJ/gm} \\ \gamma = 1.25 \text{ (for high temperature flow region)} \\ V_{Jet} = 1 \text{ km/sec} \\ \rho_{Jet} = 1.0 \text{ gm/cm}^3 \\ \alpha_{max} = .067 = \text{maximum fuel/air mixture ratio} \\ A_{hole} = A_{TAV} \end{cases} \quad (30)$$

Figure 8:
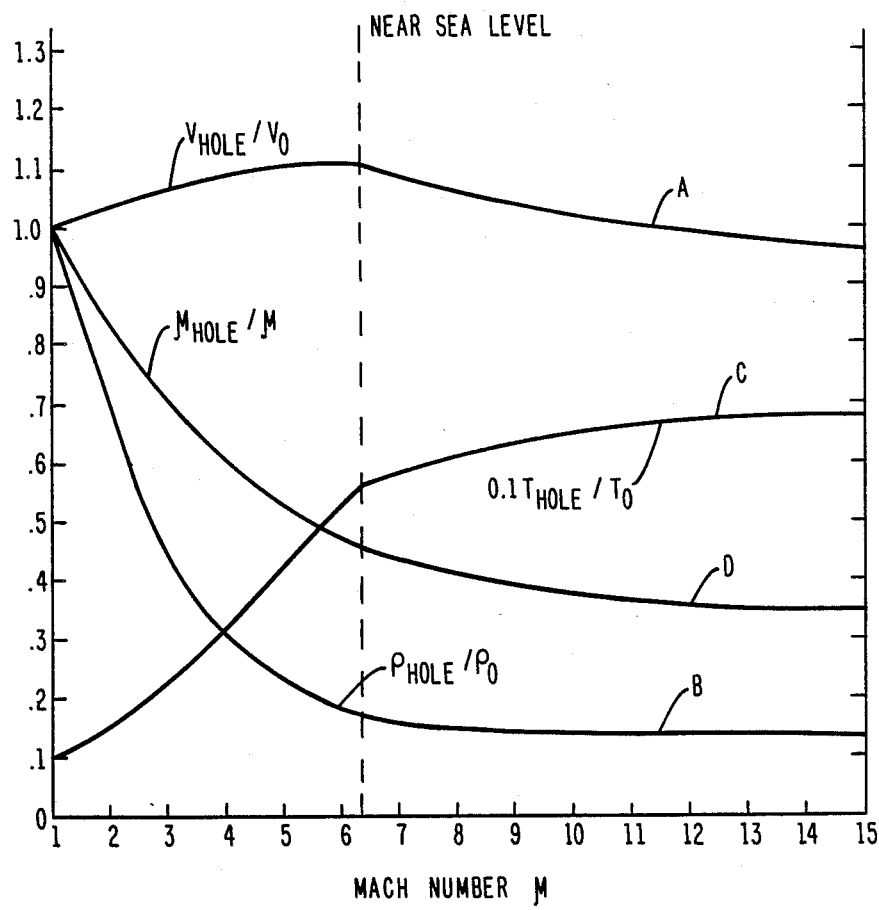
FIG. 8 graphically presents, as a function of Mach number, the variation of key dimensionless flow parameters in the hole-boring region produced ahead of a body travelling at supersonic speed through the atmosphere and employing apparatus according to the present invention near sea level.
Figure 9:
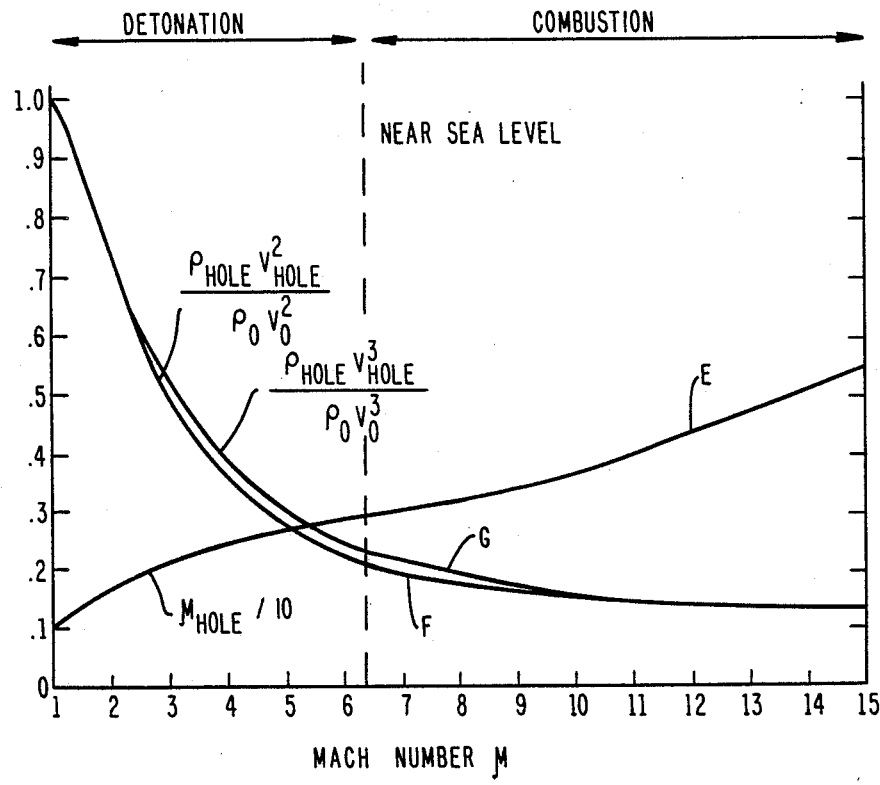
FIG. 9 graphically presents, as a function of the Mach number, the variation of reduction ratios for momentum and energy fluxes on a body travelling at supersonic speed through the atmosphere and employing apparatus according to the present invention near sea level.
Figure 10:
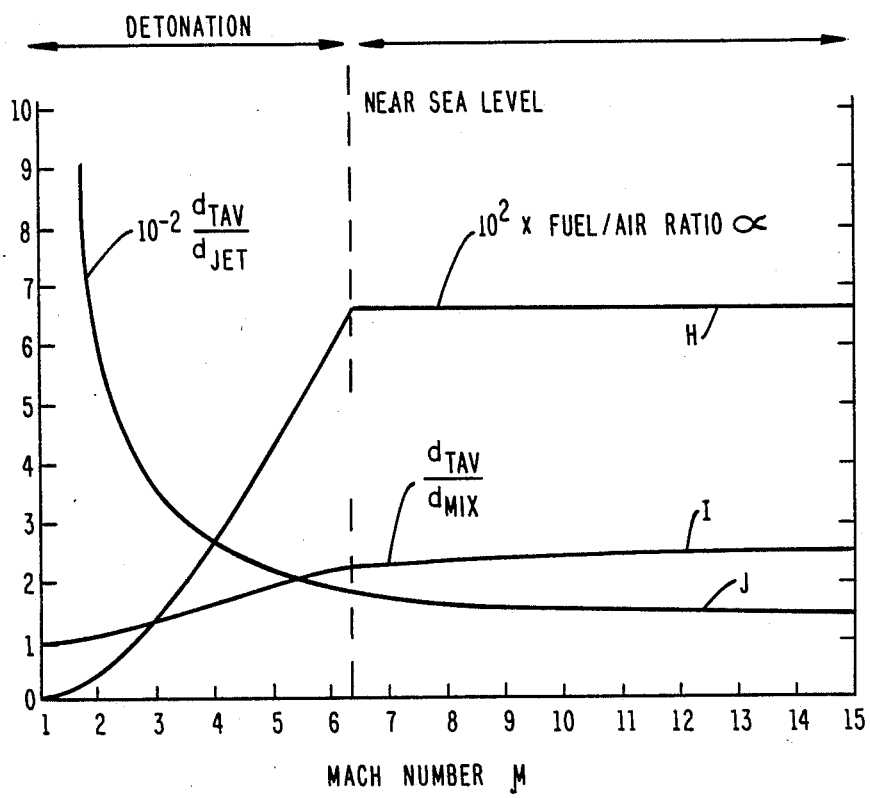
FIG. 10 graphically presents, as a function of Mach number, variations of ratios of a characteristic diameter of a body traversing the atmosphere at supersonic speed and, respectively, the diameters of a jet of a flammable liquid ejected forwardly of the body and the characteristic diameter of the air fuel mixture in the combustion region. This figure also carries the graphical representation of the variation of a fuel/air ratio as a function of Mach number for such a body employing apparatus according to the present invention, near sea level.

FIGS. 8, 9 and 10 show several quantities plotted as a function of sea level TAV Mach number M for the range $1 < M < 15$, i.e., the velocity range $0.33 < V_o < 4.95$ km/sec. The transitions between detonation wave solutions and combustion wave solutions occur at a Mach number $M_{det} = 6.3$ for the above parameters.

From FIG. 8 it is seen that in the hole region the density at high Mach numbers becomes a small fraction of the ambient air density and for example $\rho_{hole}/\rho_o = 0.17$ at $M = 8$ (see curve B). The air temperature in the rarefaction at $M = 8$ is $5.9 T_o \approx 1,700°$ K., and the Mach number of the flow impacting the TAV is $M_{hole} = 0.4 M = 3.2$.

FIG. 9 illustrates the variation with Mach number of the momentum flux and energy flux incident on the TAV relative to the values of these quantities without hole boring. These are the fundamental fluxes that appear in the formulae for the drag and heat flow to the TAV as discussed earlier.

The fuel/air mixture ratio $\alpha$ is plotted in FIG. 10 (as curve H). This mixture becomes very lean (and $d_{Jet}$ small) as $M \to 1$, corresponding to the requirement that only a very weak detonation wave suffices to give a steady state detonation velocity equal to the TAV velocity. In this $M \to 1$ limit the hole boring becomes very weak. For the low Mach number range it would of course be possible to inject fuel ahead of the TAV at a rate faster than required by the above model. The resulting fireball would however expand outward in all directions from the mixing region with a velocity higher than the TAV velocity $V_o$. Although a model could be developed for the low Mach number range $0 < M < 1 + \epsilon$, the hole boring process is not usually required or advantageous at such low velocities since the drag and ablation levels are small.

The diameters of the jet and leading edge detonation region, $d_{Jet}$ and $d_{mix}$, are also plotted in FIG. 10 as curves J and I respectively. At a Mach number of $M = 8$, for example, $d_{Jet} = d_{TAV}/180$ and $d_{mix} = d_{TAV}/2.5$. Also note that equation (28) for the jet penetration distance $l_{Jet}$ can be written:

$$\frac{l_{Jet}}{d_{TAV}} = \left(\frac{V_J}{V_o + V_J}\right)^2 \left(\frac{d_{Jet}}{d_{TAV}}\right)\left(\frac{l}{d_{Jet}}\right), \quad (31)$$

where $l$ is the total range of a jet of velocity $(V_o + V_J)$ and diameter $d_{Jet}$ in static air of reduced density $\rho_{hole}$. For $M = 8$ and the parameter choice (30) this gives $l_{Jet}/d_{TAV} = (l/d_{Jet})/2,380$, i.e., provided $(l/d_{Jet}) > 2,380$ the jet can penetrate several TAV diameters into the air ahead of the TAV as required for effective hole boring. Higher jet injection velocities may become desirable at very high TAV Mach numbers.

Figure 11:
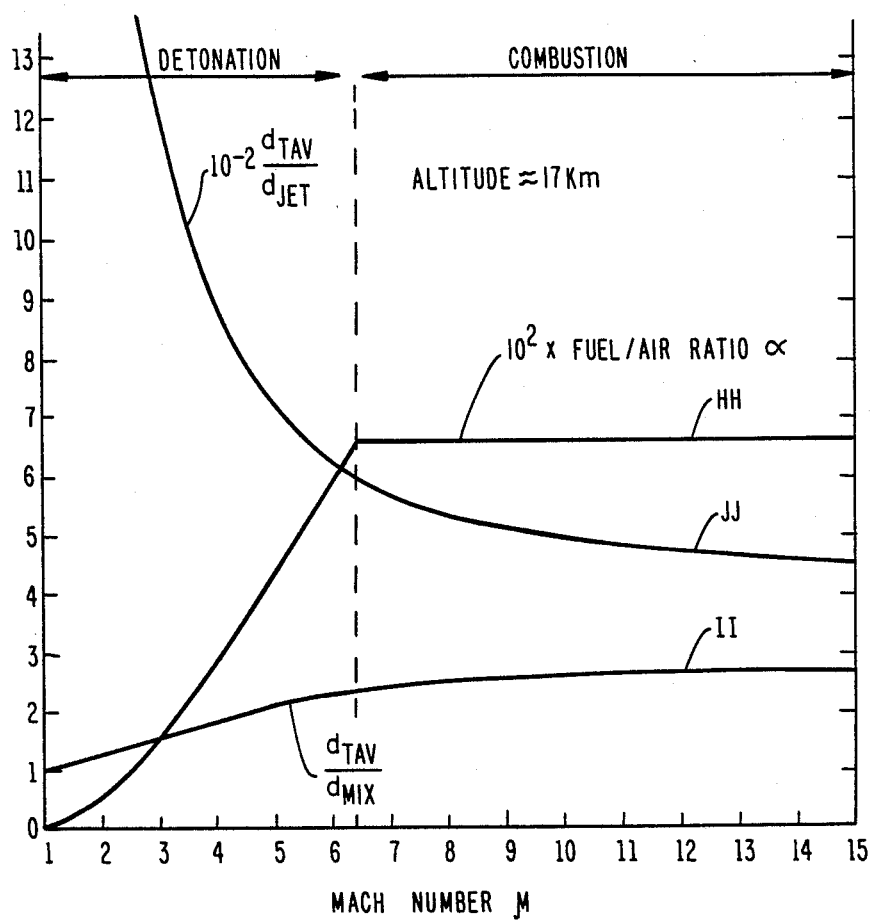
FIG. 11 graphically presents, as a function of Mach number, variations of ratios of a characteristic diameter of a body traversing the atmosphere at supersonic speed and, respectively, the diameters of a jet of flammable liquid ejected forwardly of the body and the characteristic diameter of the air fuel mixture in the combustion region. This figure also carries the graphical representation of the variation of a fuel/air ratio as a function of Mach number for such a body employing apparatus according to the present invention, at an altitude of approximately 17 kilometers above sea level.

FIG. 11 plots the same quantities as FIG. 10 using the input parameters listed in Eq. 30, except that the atmosphere density is chosen as $\rho_o = 10^{-4}$ grams/cm$^3$ corresponding to an altitude of about 17 km above sea level. The jet fuel flow required for this high altitude hole boring is substantially reduced as compared to the sea level values.

Consideration must now be given to the structural aspects of the present invention to realize the benefits expected from the analysis.

Referring now to FIG. 4, there is illustrated in longitudinal cross-sectional view an apparatus 60 for generating the requisite high velocity stream or jet 34. In this apparatus, particularly suitable for a TAV such as a large rocket, manned spaced vehicle or the like, a fuel supply 62 is carried within the TAV to contain an oxidizable fuel to be used to generate high pressures to eject stream 34 from the TAV. To cause combustion of the fuel contained in fuel supply 62, there is also carried a separate supply 64 of oxygen, preferably in liquid state for compactness. Fuel and oxygen are delivered, respectively, from supplies 62 and 64 through piping 70 and 72 to respective injectors 74 (for the fuel) and 76 (for the liquid oxygen), injectors 74 and 76 being provided in such a manner that the materials injected therethrough will mingle rapidly. Injectors 74 and 76 for the fuel and oxygen, respectively, are positioned at each of the two ends of a cylindrical body 78 provided with an internal thermally insulating liner 80 in a preferred embodiment.

As will be appreciated by persons skilled in the thermodynamic arts, combustion of the fuel and oxygen results in a generation of high temperatures. Loss of thermal energy therefrom without the production of useful work reduces the operational efficiency of the overall system and is best avoided. The provision of a thermally insulating liner 80 as illustrated in FIG. 4, therefore, helps maximize efficiency of the system.

Within the inner cylindrical surface of thermally insulating liner 80 there are provided apertures to permit access of the fuel and oxygen mixture to ignition-promoting devices, e.g., spark plugs 82, that are preferably provided with electrical power from a source not illustrated in FIG. 4. In other words, once the fuel and oxygen are mixed thoroughly, at appropriate times sparks provided by ignition-promoting means 82 cause combustion within the cylindrical zones defined at both ends of thermally insulating cylindrical liner 80. Between the two ends of the cylindrical zone are provided exhaust openings 84 for the periodic elimination of the products of the combustion of the fuel and oxygen.

A large diameter piston 86 is slidingly contained within cylindrical liner 80 and is motivated to move in a reciprocating motion from one end of the cylinder to the other in correspondence with appropriately timed combustion of the fuel and air mixture on opposite sides thereof. In fact, the apparatus as described hitherto has many points of similarity with the conventional free-piston engine.

Piston 86 is either integral with or is directly and coaxially connected to a smaller diameter piston 88 which is closely and slidingly contained within a cylindrical portion 90 that extends from cylinder 78. Therefore, as piston 86 reciprocates back and forth within cylindrical thermally insulating liner 80, under the action of forces generated by combustion on either side thereof, small diameter piston 88 also reciprocates within cylinder 90. Cylinder 90 extends on a side away from cylinder 78 to provide a containment zone for a pressure accumulator means to be described hereinafter.

Piston sealing rings 94 for larger diameter piston 86 and piston sealing rings 96 around smaller diameter piston 88, of known types for such purposes, are provided as indicated in FIG. 4.

It will be appreciated that because of a much larger cross-sectional area of larger diameter piston 86 as compared to the relatively smaller diameter of small diameter piston 88, there will be considerable intensification of pressure at the latter due to the reciprocating motion of the piston assembly. In other words, when the force generated by combustion of the fuel and oxygen mixture pushes piston 86 toward the right in the illustration of FIG. 4, an end surface of small diameter piston 88 will exert a commensurately larger pressure on any fluid that it can act upon.

From a supply (not shown) of the material to be ejected by stream 34 from the TAV 22, a pipe 98 brings the material to a check valve 100 of known type into a cavity 102 having a cross-section somewhat larger than that of cylindrical surface 90 which closely and slidingly contains small diameter piston 88. To either end of cavity 102 are provided openings 104 and 106 through which the material is forced under pressure in correspondence with the rightward motion of smaller diameter piston 88. A one-way valve 108 is provided in zone 102 to facilitate high pressure transfer of the pressurized material therethrough under the action of piston 88 and to retard return motion thereof from the pressure accumulator structure downstream thereof.

In actual operation, therefore, material to generate jet 34 is drawn in from a supply (not shown) when piston 88 moves to the left as illustrated in FIG. 4, is forced under pressure due to motion of piston 88 to the right to pass through opening 106 past one-way valve 108 into an extension 110 of cylinder 92. Within extension 110 there is provided an annular cylindrical containment cavity 112 connected by one or more openings 114 to receive the pressurized material forced past valve 108 by piston 88 moving to the right. Annular cylindrical cavity 112 is divided into two longitudinal zones by an annular sliding piston 116 which separates the pressurized material from a compressible gas 118. Thus, gas 118 is compressed when piston 88 is forcing material into a central containment cylinder 120 coaxial with annular cylinder 118 and, when piston 88 is moving to the left gas 118 expands against annular piston 116 to forcibly eject material from annular cylinder 112 through openings 114 into central containment zone 120 for forcible high pressurized ejection thereof through a connection end 122 containing an opening 124. Thus, the entire structure downstream of opening 104 serves as an accumulator of pressurized material to be ejected from the TAV.

To summarize, fuel and oxygen are mixed and burned to reciprocate a large diameter piston 86 which drives a smaller diameter piston 88 to pressurize a material to be ejected as stream 34, this pressurized material being contained in a volume of variable dimension such that a highly pressurized gas 118 makes an annular cylinder 112 a pressure accumulator, whereby pressurized material substantially contained in a central cylindrical volume 120 is delivered through an opening 124. The various volumes, e.g., of cylinders 112 and 120, can be readily selected to maintain the pressurized material therein within a predetermined range of pressure values. In a practical application, opening 122 probably would be located near the nose end 26 of TAV 22, i.e., at the attached end of barrel 28.

As previously mentioned, the structure illustrated in FIG. 4 is particularly suitable for a relatively large TAV that can carry supplies of fuel and liquid oxygen to generate a high pressure and utilize a relatively large pressure accumulator to eject substantial quantities of material as stream 34. The principles and benefits of the present invention are equally applicable and realizable in relatively smaller bodies such as projectiles that are used only once in fulfilling their purpose. Such projectiles, e.g., large shells fired from land-based or battleship-based guns can also increase their speed and range by generating and maintaining a region of low mass density directly forward thereof.

Referring now to FIG. 5, there is illustrated in longitudinal cross-section a very simple apparatus suitable for use with a projectile. Such a projectile 140 has a generally cylindrical main body portion 142 with one or more fins 144 for stabilization. At an end away from fins 144, main body section 142 can conveniently be provided with a threaded end to which is fixed a nose cone section 148 which may be of a different material. Also, very conveniently as illustrated in FIG. 5, a nozzle piece 150 can be fitted and affixed between conical nose piece 148 and main body 142 of projectile 140. Any material ejected from nozzle piece 150 will be emitted from end surface 152 thereof and, in this embodiment, would be directed through coaxial opening 154 in the nose cone portion 148 of the projectile.

Within main body 142 there is provided a cylindrical portion 156 which may contain, for reasons already discussed, a thermally insulating liner 158. In this particular embodiment, since it is a "one-shot" device, liners 158 may be made of a material with a component that gasifies, physically or chemically, generate gas upon being heated, thereby to augment the pressure on the material to be ejected.

Toward the fin end of body 142 is provided a cavity 160 connecting with cylindrical cavity 156 and carrying therewith a suitably shaped extension of thermally insulating liner 158. From the start, a portion of the space defined by a cylindrical thermally insulating liner 158 is provided a quantity 162 of material to be ejected from nozzle 150. The piston 164 is slidingly contained within cylindrical thermally insulating liner 158 and is sealed with respect thereto by one or more sealing rings 166. Piston 164 physically separates the material 162 from an explosive composition or material 168 contained within cavity 160. Forcible movement of piston 164 toward the nose cone end will drive material 162 into a small diameter cylinder 170 toward the nozzle piece 150 for ejection therefrom. A detonator device 172 of known type is fitted in the finned end of projectile 140 and is held in place preferably by a threaded insert 174.

As will be appreciated, when such a projectile 140 is launched from a gun barrel under the action of forces generated by an external explosion, the force of such an explosion will be communicated via an opening within insert 174 to detonator 172 which, once projectile 140 is launched, will cause an explosion of explosive material 168 within cavity 160. This explosion within the body 142 of projectile 140 will generate products of combustion at a high temperature and pressure that will then drive piston 164 forwardly of projectile 140 to forcibly act on material 162 and drive the same through a relatively narrow diameter zone 170 toward the shaped entry portion 176 of nozzle piece 150 to guide and accelerate the material 162 therethrough as a very high speed stream. If the material of liner 158 behind moving piston 164 releases additional gaseous products when heated by the explosion this will augment the pressure brought to bear on material 162 being ejected.

In yet another alternative version of the embodiment principally illustrated in FIG. 5, the detonator element 172 is a radio-actuated detonator of known type rather than one set off by the force that causes the projectile to be launched. It is then possible to first launch the projectile, let it travel at a high velocity and then, e.g., on being fired down toward the atmosphere from space, on its encountering denser atmosphere having a radio signal sent to the radio-actuated detonator to initiate the ejection of material to reduce drag. As will be readily appreciated, such a radio-actuated initiation of the material ejection can be obtained by the use of known radio-control relays for even the TAV that was described in the embodiment discussed earlier. It should also be well within the skill of persons skilled in the art to replace a radio-control to initiate material ejection by any known device sensitive to a sensed condition of the atmosphere around the body, e.g., static pressure (altitude), or the like.

As was mentioned earlier, and as will be understood by persons skilled in the art, it is highly desirable that the material ejected from nozzle 150 maintain a degree of coherence sufficient to carry the ejected material a predetermined distance forward of the projectile (or the TAV as in the previously described embodiment), before turbulent interaction thereof with the atmosphere and the generation of the fine spray that eventually ignites and maintains the "fireball" ahead of the moving body. One solution that has been found practical for the generation of coherent high speed jets of essentially flowable material is the addition of long chain polymers.

Referring now to FIG. 6, which shows a nozzle 150 in cross-section along the axis of the ejected stream 34 having an outer boundary surface 180, it will be understood that long chain molecules connected along within the material of the stream enhances the viscosity of the fluid which in turn tends to prevent transverse eddy motion across the direction or motion of the stream 34. The result will be a stream having an outer boundary cylindrical surface 180 that will be maintained a considerable distance past end surface 152 to which the stream is guided by nozzle piece 150. The enhanced viscosity due to the long chain molecules tends also to resist the development of turbulence caused at surface 180 by interaction with the surrounding atmosphere and will thus facilitate travel of the ejected material a considerable distance ahead of the projectile or TAV.

Also, as will be understood by an appreciation of the analysis presented hereinabove, in order to achieve a sufficiently large cross-section due to the forces generated by the exploding "fireball" maintained ahead of the TAV or projectile, it may be highly desirable to add particulate material to the flammable material being ejected in stream 34.

The presence of particulate material mingled with the flammable material, especially in the region of the fireball, will cause a larger transverse dispersal of the products of combustion of the "fireball". FIGS. 6 and 7 may be taken as illustrative of how particulate material mixed in the flowable material being ejected from the nozzle will tend to follow the streamlines in the jet. This will generate an enlarged cross-sectional zone of reduced atmospheric mass density in front of the TAV. Naturally, in order to ensure that the particulate material and the flammable component of the ejected material of stream 34 are always well mingled, means may be utilized to contain the mixture in the form of a uniform slurry. It may also be convenient to have the mixture essentially in solid form until it is needed to be pressurized and ejected, e.g., a mixture of paraffin and a fine particulate material could be heated and stirred in known manner to generate such a uniform slurry of a particulate component and a flammable component for pressurized ejection thereof. If the particulate material is selected to have a relatively high mass density, then it may need to be used only in relatively small quantities and, because the actual propulsion of high speed TAVs, e.g., rockets, is of relatively short duration, there should be no significant deterioration of the geometry of surface 176 of nozzle piece 150 due to high speed flow of particulate matter guided thereby. In other words, mixing in a particulate matter with the flammable matter being ejected as stream or jet 34 to maintain the "fireball" a significant distance ahead of the TAV may also facilitate the generation of a large cross-sectional zone of reduced mass density. Such particulate matter may even be selected to be material that burns at a different rate from the principal flammable component of the ejected material.

It will be appreciated that use of particulate matter is not limited just to TAVs but may be utilized even with projectiles. Likewise, long chain molecules may be mixed in with or without particulate matter in the mixture with the principal flammable component of the ejected material in either embodiment.

It is anticipated that for applications where the ejected material is most conveniently stored in liquid form, conventional turbine fuels, e.g., JP3 or JP4, may be utilized by themselves. Suitable particulate materials may be powdered forms of hydrocarbons such as polyethylene, or metallic powders such as boron, magnesium, or aluminum, or various mixtures of such powders mixed, for example, with fuel gels or solid paraffin that flow under pressure but avoid settling of the flammable powder from the flammable fuel prior to use. Long chain molecule additives suitable for use with the present invention include, but are not limited to, various polymers such as gelatin, or polyalkylene oxides such as polyethylene oxide, or methyl celluloses.

It will be appreciated that once the ejected material leaves the nozzle it begins to be slowed down by interaction of the surrounding atmosphere. Therefore, if it is desired that to ensure that the "fireball" 42 is maintained at a considerable distance ahead of the TAV, one solution would be to provide a relatively long barrel 28. If the TAV is to have various operational functions and operate at commensurately different speeds for utilizing the present invention, it may even be desirable to have barrel 28 retractable within the body of the TAV, and the same effect may be realized by providing barrel 28 with a telescoping internal segment that can be projected controllably as desired. In any case, practical considerations would dictate that a nozzle piece 150 would be located very close to the forwardmost end of opening 30 of barrel 28. It is anticipated that pressures of the order of 1 or 2 kilobars may be necessary to eject a material such as JP3 or JP4 at speeds of up to 1 kilometer per second relative to the TAV. In order to survive operation at such high pressures, barrel 28 would have to be made of a material and a thickness operating at high pressure with an adequate level of safety. It is believed that there exists adequate technology in fields such as generation of high speed jets for cutting through hard material and the like so that materials and manufacturing technology are readily available to persons skilled in the relevant arts.

It is anticipated that persons skilled in the relevant arts, armed with the knowledge provided by this disclosure, will contemplate a variety of modifications in the structure and uses of this invention. All such modifications and variations are expressly contemplated as being encompassed within the claims appended below.

What is claimed is:

1. Apparatus carried with a body, for facilitating supersonic travel of the body through the atmosphere, comprising:
   a supply of a material adapted to be carried with the body and adapted to be ejected from the body, said material comprising a component adapted to interact chemically in the atmosphere; and
   means for ejecting a controlled jet of said material forwardly from said body into the atmosphere approaching said body at a supersonic speed relative thereto, for producing a chemical interaction of said interactive component in the atmosphere at a predetermined distance ahead of the body to thereby generate an atmospheric zone of reduced mass density in front of the body.

2. Apparatus according to claim 1, wherein: said material is flowable under pressure.

3. Apparatus according to claim 2, wherein: said ejecting means comprises means for pressurizing said flowable material to a predetermined pressure for ejection thereof as a controlled jet.

4. Apparatus according to claim 3, wherein: said ejecting means comprises nozzle means for accelerating said pressurized flowable material to a predetermined speed relative to said body.

5. Apparatus carried with a body, for facilitating supersonic travel of the body through the atmosphere, comprising:
   a supply of material adapted to be carried with the body and adapted to be ejected from the body, said material being flowable under pressure and of a type such that a component thereof interacts in the atmosphere to generate an atmospheric zone of reduced density; and
   means for ejecting a controlled jet of said material forwardly from said body into the atmosphere approaching said body at a supersonic speed relative thereto, for producing an interaction of said interactive component in the atmosphere at a predetermined distance ahead of the body to thereby generate said atmospheric zone of reduced mass density in front of the body, wherein said flowable material comprises a flammable flowable component.

6. Apparatus according to claim 5, wherein: said flowable material comprises a solid component.

7. Apparatus according to claim 6, wherein: said solid component comprises particulate matter having a characteristic dimension within a predetermined size range related to the amount of lateral spreading and range required of the jet for said body as the jet travels through the atmosphere.

8. Apparatus according to claim 7, wherein: said particulate matter comprises at least one member selected from a group consisting of powdered hydrocarbons, polyethylene, boron, magnesium, and aluminum.

9. Apparatus according to claim 8, wherein: said characteristic dimension lies in the size range of one to one hundred micrometers.

10. Apparatus according to claim 5, wherein: said flammable flowable component comprises at least one member of a group of hydrocarbon materials consisting of JP4, fuel gel and solid paraffin.

11. Apparatus according to claim 6, wherein: said flowable material also comprises a flowable interactive component for interacting with the flammable flowable component to provide said interaction in the atmosphere.

12. Apparatus according to claim 6, wherein: said solid component comprises a member of a group of long chain molecular materials consisting of polyalkyline oxides, methyl celluloses and gelatin.

13. Apparatus according to claim 5, wherein: said flammable component chemically reacts with oxygen in the oncoming atmosphere to detonate immediately downstream of a detached shock that coacts with the material being ejected to create a localized zone of high energy release that displaces the atmosphere outwardly to generate said atmospheric zone of reduced mass density in front of the body.

14. Apparatus carried with a body, for facilitating supersonic travel of the body through the atmospheric, comprising:
   a supply of a material adapted to be carried with the body and adapted to be ejected from the body, said material being of a type such that a component thereof interacts in the atmosphere to generate an atmospheric zone of reduce density; and
   mean for ejecting a controlled jet of said material forwardly from said body into the atmosphere approaching said body at a supersonic speed relative thereto, for producing an interaction of said interactive component in the atmosphere at a predetermined distance ahead of the body to thereby generate said atmospheric zone of reduced mass density in front of the body, wherein said material is flowable under pressure and said ejecting means comprises means for pressurizing said flowable material to a predetermined pressure for said ejection thereof as a controlled jet.

15. Apparatus according to claim 14, wherein: said high pressure generating means comprises a cylinder and piston means slidingly guided in said cylinder to transfer a mechanical force produced by said combustion to a quantity of said flowable material to generate a high pressure thereon.

16. Apparatus according to claim 15, wherein: said combustion occurs substantially inside a first portion of said cylinder, whereby the product of said combustion generates said mechanical force on a first surface of said piston to forcibly move the same to exert said mechanical force transferred thereby to said flowable material.

17. Apparatus according to claim 16, wherein: said combustion alternately also occurs inside a second portion of said cylinder so that the product thereof acts on a second end surface of said piston to drive the same in a direction opposite to said mechanical force in alternation therewith, thereby to produce a reciprocating motion of said piston in said cylinder.

18. Apparatus according to claim 17, further comprising:
first and second combustion initiating means in communication with said first and second portions of said cylinder for controllably initiating said alternating combustions therein.

19. Apparatus according to claim 17, further comprising:
means for receiving and accumulating a quantity of said flowable material pressurized by said pressurizing means, connected to said nozzle means for providing a supply of said flowable material at a pressure higher than a predetermined high pressure level for said acceleration thereof by said nozzle means.

20. Apparatus according to claim 14, wherein:
said combustible material comprises an oxidizable material and an oxidizing material maintained separate except to produce said combustion by a controlled oxidizing reaction therebetween.

21. Apparatus according to claim 20, further comprising:
means for initiating said combustion of said combustible material in response to a predetermined initiating signal from an external source.

22. Apparatus according to claim 14, further comprising:
a thermally insulating cylinder liner inside said cylinder to guide said piston therein and to substantially contain the ignited combustible material to reduce loss of thermal energy therefrom after ignition.

23. Apparatus according to claim 14, wherein:
said combustible material is carried with the body as a mixture comprising an oxidizable material and an oxidizing material in predetermined proportions.

24. Apparatus according to claim 23, further comprising:
means for initiating said combustion of said combustible material in response to a predetermined initiating signal from an external source.

25. Apparatus according to claim 24, wherein:
said combustion initiating means is actuated in response to an external force applied to produce the supersonic motion of said body relative to the atmosphere.

26. Apparatus according to claim 24, further comprising:
a thermally insulating cylinder liner inside said cylinder to guide said piston therein and to substantially contain the ignited combustible material to reduce loss of thermal energy therefrom after ignition.

27. A transatmospheric vehicle )TAV) for travel through the atmosphere at supersonic speed, comprising:
a supply of a material carried with the TAV, said material being of a type such that a constituent thereof when ejected from the vehicle into the atmosphere interacts chemically in the atmosphere and
means carried with the TAV for ejecting a controlled jet of said material forwardly from said vehicle into the atmosphere approaching said vehicle at a supersonic speed relative thereto, for producing a chemical interaction of said constituent in the atmosphere at a predetermined distance ahead of the vehicle to generate thereby an atmospheric zone of reduced mass density in front of the vehicle.

28. A method of facilitating supersonic travel of a body through the atmosphere, comprising the step of:
reducing atmospheric mass density in front of a body travelling through the atmosphere at supersonic speed by ejecting a flow of a chemically interactive material from the body forwardly thereof at a high velocity relative to the body and atmosphere such that the ejected material is heated solely thereby and interacts chemically to release thermal energy in the atmosphere in a region located a predetermined distance forwardly of the body to thereby provide said reduced atmospheric mass density.

29. The method according to claim 28, wherein:
the ejected material and a material in the atmosphere interact chemically to thereby transversely displace air from said region.

30. A method of facilitating supersonic travel of a body through the atmosphere, comprising the step of:
reducing atmospheric mass density in a region immediately in front of a body travelling through the atmosphere at supersonic speed by ejecting a mass of a material from the body forwardly thereof, the ejected material interacting in the atmosphere to provide the reduced atmospheric mass density, wherein the ejected material and material in the atmosphere interact to transversely displace air from said region and said step of reducing atmospheric mass density by said interaction of said ejected material and the material in the atmosphere includes the steps of maintaining at a predetermined distance ahead of the vehicle a zone where said interaction produces a high rate of release of thermal energy and high temperature products of combustion that continually explode so as to displace the oncoming atmosphere outwardly in all directions and thereby create said zone of reduced mass density in front of the vehicle.

31. A method for facilitating supersonic travel of a body through the atmosphere, comprising the steps of:
ejecting a controlled jet of a material that includes a combustible component forwardly from said body into the atmosphere approaching said body at a supersonic speed relative thereto, said combustible component of said ejected material igniting and combusting by interaction with the atmosphere at a predetermined distance ahead of the body, thereby to generate said region of reduced atmospheric mass density in front of the body.

32. A method according to claim 31, comprising the further step of:
rendering said ejected material substantially flowable to enable ejection thereof as said controlled jet to maintain said combustion at said predetermined location ahead of the body.

33. A method according to claim 32, comprising the further steps of:
pressurizing said flowable material to a predetermined pressure for said ejection thereof as said controlled jet.

34. A method according to claim 33, comprising the further step of:
accumulating said pressurized flowable material and maintaining a quantity thereof at a pressure higher than a predetermined high pressure level.

35. A method according to claim 34, comprising the step of:

flowing said accumulated pressurized material through a nozzle means for thereby accelerating said flowed pressurized material to a predetermined speed relative to said body.

36. A method according to claim 33, comprising the further step of:

flowing said pressurized fluid material through a nozzle means for thereby accelerating said pressurized flowable material to a predetermined speed relative to said body.

37. A method according to claim 33, wherein:

said pressurizing step comprises the further step of providing controlled combustion of a quantity of combustible material in a cylinder to thereby forcibly drive a piston slidingly along said cylinder to generate a high pressure on said flowable material.

38. A method according to claim 37, comprising the further step of:

thermally insulating the product of said controlled combustion to reduce heat transfer therefrom during said forcible motion of said piston in said cylinder.

39. A method according to claim 37, comprising the further step of:

providing a signal to initiate said controlled combustion after launch of the body.

40. A method according to claim 39, wherein:

the step of providing said control signal is actuated in response to a sensed condition of the atmosphere through which the body travels in supersonic motion.

41. A method according to claim 32, comprising the further step of:

including a solid constituent in said flowable material in a substantially uniformly mixed state therein.

42. Apparatus carried with a body, for facilitating supersonic travel of the body through the atmosphere, comprising:

a supply of a material adapted to be carried with the body and adapted to be ejected from the body, said material being of a type such that a component thereof interacts in the atmosphere to generate an atmospheric zone of reduced density; and means for ejecting a controlled jet of said material forwardly from said body into the atmosphere approaching said body at a supersonic speed relative thereto, for producing an interaction of said interactive component in the atmosphere at a predetermined distance ahead of the body to thereby generate said atmospheric zone of reduced mass density in front of the body, whereby material ejected by said ejecting means interacts in the atmosphere close to and downstream of a detached shock wave generated by propagation and disintegration of the jet to create a localized zone of high energy release.

43. Apparatus according to claim 42, wherein:

said interaction is promoted by a temperature rise across the detached shock wave due to the strong flow discontinuities thereat.

44. Apparatus according to claim 43, wherein:

the strength of the detached shock wave and the locations of the detached shock wave and the high energy release zone downstream of the shock wave are determined by the velocity of the ejected jet relative to the body.

* * * * *